(12) United States Patent
Laude et al.

(10) Patent No.: US 7,747,087 B2
(45) Date of Patent: Jun. 29, 2010

(54) APPARATUS, METHOD, AND ARTICLE OF MANUFACTURE USED TO ENCODE INFORMATION INTO AN IMAGE AND TO DECODE INFORMATION FROM A CAPTURED IMAGE

(76) Inventors: Michael Laude, 4881 Orchard Ave., San Diego, CA (US) 92107; Kristen Glass, 4881 Orchard Ave., San Diego, CA (US) 92107

( * ) Notice: Subject to any disclaimer, the term of this patent is extended or adjusted under 35 U.S.C. 154(b) by 887 days.

(21) Appl. No.: 11/459,927

(22) Filed: Jul. 25, 2006

(65) Prior Publication Data

US 2008/0025553 A1    Jan. 31, 2008

(51) Int. Cl.
*G06K 9/36* (2006.01)

(52) U.S. Cl. .................. 382/232; 382/100; 380/231; 345/501

(58) Field of Classification Search .................. 382/100, 382/232; 380/231; 345/501
See application file for complete search history.

(56) References Cited

U.S. PATENT DOCUMENTS

| | | | |
|---|---|---|---|
| 2002/0093953 A1* | 7/2002 | Naim et al. .................. 370/386 |
| 2002/0186844 A1* | 12/2002 | Levy et al. .................. 380/231 |
| 2003/0112471 A1* | 6/2003 | Damera-Venkata et al. 358/3.28 |
| 2005/0080681 A1* | 4/2005 | Ohnishi ....................... 705/24 |

\* cited by examiner

*Primary Examiner*—Vikkram Bali
*Assistant Examiner*—Eueng-Nan Yeh

(57) ABSTRACT

This patent describes a system for encoding information such as identity into an image or series of images. It also describes a system for identifying, extracting, and decoding that information from the image or images. The encoding process is designed to minimize the damage to the perceived quality of the image. The decoding process is optimized for use with images generated with digital cameras and can easily be implemented in mobile communications devices.

7 Claims, 3 Drawing Sheets

Overview of the Encoding Process

Overview of the Decoding Process

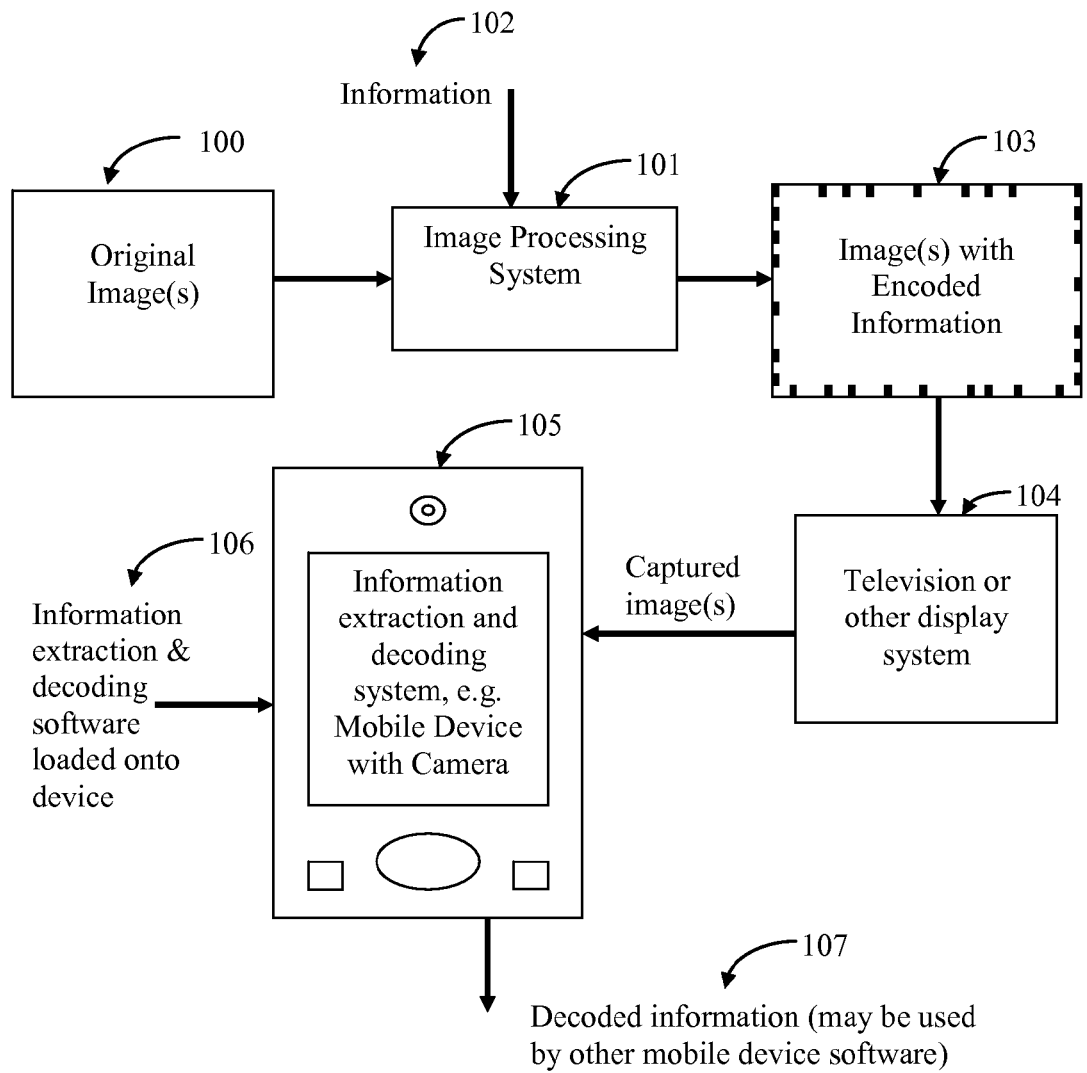
Figure 1: System Overview

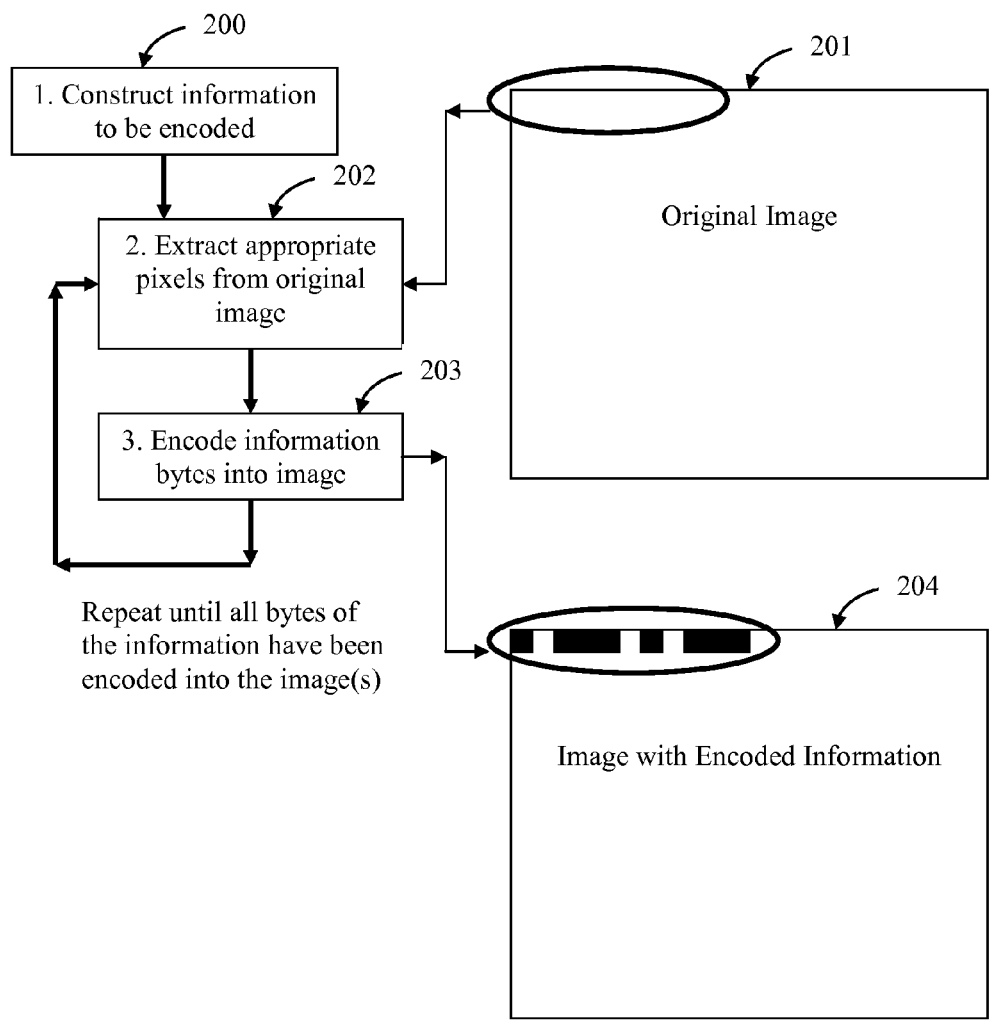
Figure 2: Overview of the Encoding Process

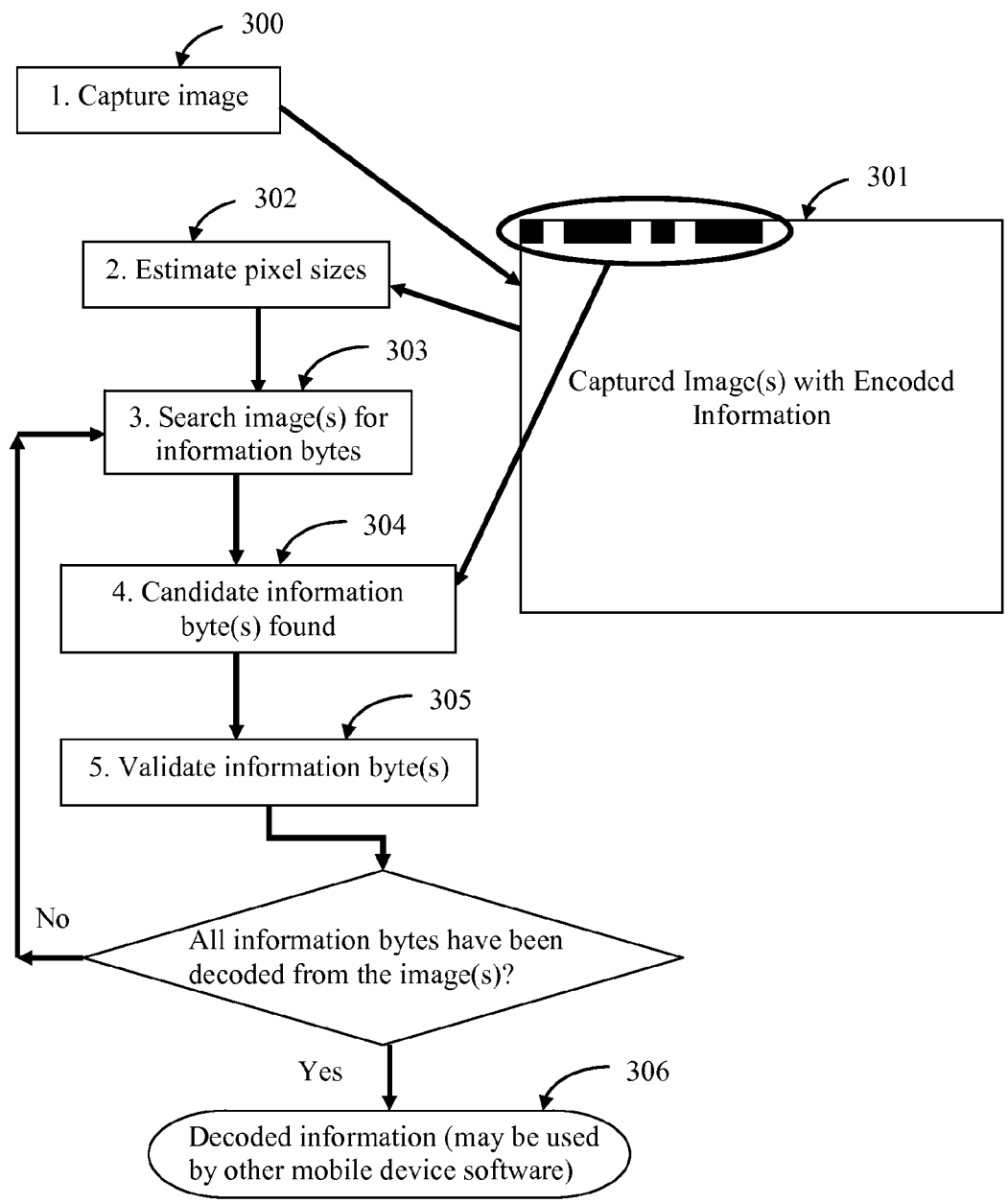
Figure 3: Overview of the Decoding Process

APPARATUS, METHOD, AND ARTICLE OF MANUFACTURE USED TO ENCODE INFORMATION INTO AN IMAGE AND TO DECODE INFORMATION FROM A CAPTURED IMAGE

FIELD OF THE INVENTION

This invention relates to the fields of information coding & image processing.

DESCRIPTION OF THE RELATED ART

There is a growing demand for interactive video services. Mobile digital camera phones and other mobile communications devices are ubiquitous and have the capability to provide an interactive television experience. Until now, this experience has been, at best, slow, clumsy, and not very interactive. For example, "instant voting" implementations simply encourage viewers to send text messages to numbers in order to vote for their favorite television personalities.

Unless they require specialized hardware, existing systems are neither instant nor truly interactive. The basic problem with existing systems is that the mobile device does not have any method discovering the context in which it is operating, for example, which program the viewer is watching. Instead, the viewer/mobile device user must supply this intelligence, greatly reducing the convenience and usability.

There is a clear need for a system that can work with existing video delivery systems and mobile devices. If we can provide an easy way for the mobile device to identify what the viewer/user is watching, we can dramatically improve the user experience. By providing mechanisms for encoding information into an image and extracting and decoding that information from a captured image, this invention provides a practical means of identifying video images.

SUMMARY OF THE INVENTION

This invention consists of an encoding system for embedding information (such as the identity of the image, contact information, etc.) into an image (or stream of images) and a simple decoding system for extracting the information from the image or images.

By allowing the viewer's mobile device to extract specific information from the image, this invention greatly simplifies the interactive experience. With this invention, the viewer simply aims the mobile device in the direction of the external display that is showing the images that contain encoded information. Software in the mobile device uses the device's camera to capture the image from an external display. The mobile device software then quickly extracts and decodes the encoded information. The decoded information may, for example, include the identity of the image or video program being viewed or phone numbers to call or text message.

Knowing the identity of the display makes it possible for software in the mobile device to display information unique to the program being viewed. For example, the mobile device could provide additional information about the program, allow the viewer to vote by selecting and clicking a box, or even allow the user to quickly change their device settings.

This invention's utility is not limited to broadcast media. It could also be useful for recorded video and even static images.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, and wherein:

(1) FIG. 1 provides an overview of the encoding/decoding system.
(2) FIG. 2 provides an overview of the encoding process.
(3) FIG. 3 provides an overview of the decoding process.

DETAILED DESCRIPTION OF THE SELECTED EMBODIMENTS

This section provides detailed descriptions of selected embodiments.

Components and Interconnections

FIG. 1 provides an overview of the encoding/decoding system components and interconnections. The original image or images (100) are fed into an image processing system (101). The image processing system may, for example, be a standard personal computer, a standard personal computer with specialized video or image processing hardware, or a specialized video or image processing computer-based device.

The image processing system encodes information (102) supplied by an operator or external system into the image or images. The output of the image processing system is an image (or images) containing the encoded information (103).

These images may be transmitted immediately or recorded for future playback on a television or other display system (104). The viewer's information extraction and decoding system, for example, a mobile device with camera (105) and information extraction and decoding software (106) captures the image or images from the display system. The software extracts and decodes the encoded information from the captured image, producing decoded information (107) that can be made available to the user or to other mobile device software.

Operation

This section describes the operation of the selected embodiments.

Encoding

FIG. 2 is a flow diagram of the encoding process performed by the image processing system (101) shown in FIG. 1.
  (1) Construct the information (200), for example, a unique identifier, to be encoded. The size of the information in bits can be adjusted to match the image size and resolution as well as the resolutions of the cameras which will be used to decode the information.
  (2) Convert the information to 8 bit bytes
  (3) In the image, the start & end of each encoded byte is indicated by "dark" pixels. A "dark" pixel simply has a minimum luminance value (usually 0). Dark pixels between the delimiter pixels indicate binary ones. The minimum luminance for "Light" pixels, indicating zeroes, may be selected to match the capabilities of the display device and the digital camera. Ideally, the vast majority of light pixels should be unmodified image pixels.
(4) Using the bit values and the pixel values from the original image (201, 202), encode each byte into a start delimiter, light and dark pixels, a parity pixel, and an end delimiter. A dark parity pixel denotes odd parity. A light pixel denotes even parity. For more advanced displays and cameras, the parity pixel is optional.
(5) Insert the encoded identifier into the image edges (203), starting at an agreed location (usually the top left corner) and proceeding in an agreed direction (usually clockwise). Inserting at least one light pixel between each encoded byte reduces the chance of decoding errors. Given a typical NTSC monitor (generally capable of displaying 330 pixels horizontally & 240 pixels vertically) and a low-end digital camera (640×480), 103 bytes can be encoded and decoded around the edges of the display. The algorithm can encode more information by spiraling inward, but this usually leads to unacceptable image degradation. For additional robustness, the first two bytes may be used to indicate the length of the identifier. The value for length should not include the two length bytes, as they are not part of the identifier.
(6) For video, the identifier usually needs to be visible in multiple sequential video frames, so the insertion process must be repeated for multiple video frames.
(7) The result of this process is a modified copy of the original image with embedded encoded information (204).

Decoding

FIG. 3 is a flow diagram of the decoding process performed by the information extraction and decoding system (105) shown in FIG. 1.
(1) Capture an image containing information encoded as described above (300). Ideally, the image capture process automatically produces an image of optimum size and resolution, cropped to the edges of the desired image. To enhance the decoding process for video, the extraction and decoding system may capture several frames. The optimum number of frames is calculated based on estimates of image and camera resolution as well as camera speed.
(2) Process the image to estimate pixel sizes (302).
(3) Starting in an agreed location (usually the upper left corner) of the captured image, search for dark pixels on the edges of the display, proceeding in an agreed direction (usually clockwise) (303).
(4) When the algorithm finds a dark pixel, it looks for the closing dark pixel, which should be nine (including parity pixel) or eight (no parity) pixels from the start pixel. When the algorithm finds pixels meeting these conditions, it has identified a potential (or candidate) information byte (304).
(5) Validate the candidate information byte (305).
Analyze the pixels between the start and end pixels to determine their values. These values constitute one eight bit byte of the image identifier, plus start/end bits, plus an optional parity bit.
If multiple image frames are available, check the other frames for this same pixel pattern. Compare and, if necessary, correct for errors, or discard the byte. For example, if the byte only appears in a single frame, it is, at best suspect.
(6) Repeat this process until the entire edge of the image has been processed.
(7) Check if the first two bytes indicate the length of the identifier. If so, verify that the correct number of bytes has been processed. If more bytes are needed, continue the byte search process, spiraling inward into the image's center.
(8) Output the extracted and decoded information (306).
(9) The final verification of the extracted and decoded information is external to this algorithm. For example, the information may consist of an identifier that will be used to perform a lookup into a table or database.

Article of Manufacture

The system may be implemented as shown in FIG. 1. For example, the image processing system (101) is configured with specialized software to process video and image data. Here, the term "software" is used broadly and comprises, for example, a machine readable language construct that species an operation and identifies operands (instructions), application programs, algorithms, software configuration data, multimedia data, video data, and audio data. These data may reside in any type of storage unit using any type of data storage media. In various embodiments, the software may comprise or emulate lines of compiled "C-type" language, "Java-type" interpreted or pre-compiled language, source code, object code, executable machine code, executable programs, data banks, or other types of commonly known data.

As a further example, information extraction and decoding system (105) may be implemented in a mobile communication device with a digital camera configured with specialized software to capture images, detect, extract, and decode the information encoded in the captured images.

Other Embodiments

Despite the specific foregoing descriptions, ordinarily skilled artisans having the benefit of this disclosure will recognize that the apparatus, method, and article of manufacture discussed above may be implemented in an apparatus, system, method, or article of manufacture of different construction without departing from the scope of the invention. Similarly, parallel methods may be developed. As a specific method example, in order to minimize the impact on image quality, more advanced future systems may encode the information units into different locations in the image. In this advanced method, the coding process adds sequence numbers to the information units and places the coded information unit into sections of the image which already resemble the coded information unit. This method adds significant additional processing requirements to both the encoding and decoding systems, but may be worth adding to the system when more powerful components become available.

As a specific apparatus example, the information extraction and decoding software (106) is a key component of this invention. Although embodiments described in this patent assume that this software will run on a mobile device, the software can run on any platform.

As a specific article of manufacture example, the information extraction and decoding software (106) may be modified to become more efficient or accurate, or it may be expanded to include additional functions.

What is claimed is:

1. A method of encoding information into an image or images comprising the steps of constructing the information to be encoded, adjusting the size of the information to consider the impact on image quality;

encoding the information into bytes;

calculating the size, in bytes, of the encoded information;

pre-pending to the encoded information an optional byte or bytes specifying the size of the encoded information;

identifying, based on inputs to this method, the image pixels from the original image that are to be modified;

using the data values from the encoded information, the pixel values from the original image, and calculated or specified light and dark levels, encoding each byte of information into a start delimiter, light and dark pixels, an optional parity pixel, and an end delimiter by modifying the image pixels, balancing the impact on image quality with the capabilities of the expected capture, decoding, and extraction systems;

inserting the modified image pixels into the image, replacing the appropriate image pixels with the modified pixels;

inserting additional optional light pixels between bytes;

saving the modified image;

repeating the above steps for requested number of additional images;

saving the modified image or images.

2. A method of decoding information from an image comprising the steps of processing the image to estimate pixel sizes;

if the inputs to this method do not specify levels for dark and light pixels, process the image to calculate appropriate levels for light and dark pixels;

searching a specified area of the image for candidate start delimiter;

upon finding a candidate start delimiter pixel, looking for an end delimiter pixel, saving the intervening pixels to create a candidate information byte;

validating the candidate information byte by analyzing the pixels, checking a parity bit, if it is available, and comparing pixel values;

saving the validated candidate information byte;

repeating the process of finding candidate information bytes until the entire specified area of the image has been analyzed;

saving the validated bytes as a candidate unit of information;

correcting and verifying the candidate unit of information by checking its length and applying any available error-correcting information information to produce a verified unit of information;

saving the verified unit of information.

3. The method of claim 2, optimized for implementation in a mobile communication device.

4. The method of claim 2, optimized for processing a digital impression of an image.

5. A method of decoding information from multiple images where the same information has been encoded into each image comprising the steps of processing the image to estimate pixel sizes;

if the inputs to this method do not specify levels for dark and light pixels, process the image to calculate appropriate levels for light and dark pixels;

searching a specified area of the image for candidate start delimiter pixels;

upon finding a candidate start delimiter pixel, looking for an end delimiter pixel, saving the intervening pixels to create a candidate information byte;

validating the candidate information byte by analyzing the pixels, checking a parity bit, if it is available, and comparing pixel values;

saving the validated candidate information byte;

repeating the process of finding candidate information bytes until the entire specified area of the image has been analyzed;

saving the validated bytes as a candidate unit of information;

correcting and verifying the candidate units of information by checking their lengths and applying any available error-correcting information to produce a verified candidate unit of information;

repeating the above steps for the requested number of additional images;

comparing, and, if necessary, correcting the verified candidate units of information obtained from the images to produce a single corrected and verified unit of information;

saving the corrected and verified unit of information.

6. The method of claim 5, optimized for implementation in a mobile communication device.

7. The method of claim 5, optimized for processing digital impressions of a series of images.

* * * * *